United States Patent [19] BEST AVAILABLE COPY [11] 3,895,218

Cooke [45] July 15, 1975

[54] ELECTRIC HEATER PLATE AND TERMINAL THEREOF

[75] Inventor: William C. Cooke, Kingsport, Tenn.

[73] Assignee: ASG Industries, Inc., Kingsport, Tenn.

[22] Filed: May 2, 1974

[21] Appl. No.: 466,466

[52] U.S. Cl. ............... 219/543; 117/211; 174/68.5; 219/203; 219/522; 338/309

[51] Int. Cl. ............................................. H05b 3/16

[58] Field of Search ........... 219/203, 522, 543, 549; 117/211, 212; 174/68.5; 338/308, 309

[56] References Cited

UNITED STATES PATENTS

| | | | |
|---|---|---|---|
| 2,475,379 | 7/1949 | Stong | 219/543 X |
| 2,614,944 | 10/1952 | Lytle | 219/543 X |
| 2,623,971 | 12/1952 | Glynn | 219/543 X |
| 2,780,708 | 2/1957 | Glynn et al. | 219/543 |
| 3,041,436 | 6/1962 | Brady | 219/522 X |
| 3,063,881 | 11/1962 | Harwig | 219/543 X |
| 3,571,489 | 3/1971 | Coale | 174/68.5 |
| 3,700,510 | 10/1972 | Keene et al. | 174/68.5 X |
| 3,737,624 | 6/1973 | Ellenberger | 219/543 X |
| 3,781,524 | 12/1973 | Levin | 219/522 |
| 3,811,934 | 5/1974 | Glaser | 117/212 |

FOREIGN PATENTS OR APPLICATIONS

| | | | |
|---|---|---|---|
| 588,397 | 12/1959 | Canada | 219/543 |

*Primary Examiner*—Volodymyr Y. Mayewsky
*Attorney, Agent, or Firm*—Pennie & Edmonds

[57] ABSTRACT

An electric heater plate is disclosed comprising a sheet of tempered glass with a metallized aluminum circuit extending over the face thereof for carrying an electrical heating current. At the terminals of the metallized aluminum circuit there is provided a terminal area of silver between the glass and the metallized aluminum coating, which silver terminals are each exposed through a small opening in the metallized aluminum coating such that lead wires may be soldered to the silver through said openings.

9 Claims, 3 Drawing Figures

FIG. 3

ELECTRIC HEATER PLATE AND TERMINAL THEREOF

BACKGROUND OF THE INVENTION

In conventional electric heater plates the terminals for the metal, preferably aluminum, circuit present a unique problem in that lead wires cannot be satisfactorily soldered to the aluminum terminal areas since solder will not wet the thin aluminum oxide layer and adhere thereto. Conventional heater plates therefore, are first provided with an area of metallized bronze on the aluminum circuit at the terminal area and then a layer of molten solder is applied to the metallized bronze. While lead wires can easily be soldered to such a built-up terminal the constant manufacture of quality terminals is extremely difficult if not impossible. This is due to a number of factors, including among others, the fact that after the application of a metallized aluminum coating with an added bronze layer at the terminals and molten solder over the bronze, the circuit pattern must then be etched in the aluminum coating. To do this, the circuit pattern is silk-screened with a resist usually an enamel resist, that is resistant to the etching bath and a subsequent neutralizing bath. The terminal area is thicker than the circuit area due to these additional layers. Also, the terminal area tends not to be perfectly flat. For these reasons the resist often does not completely coat the terminal area thus exposing it to the etching and neutralizing baths. Further, when the resistant paint is baked in the oven the solder softens causing the paint over and near the terminal to blister. Accordingly, when the plate is finally etched, the blistered paint frequently leaks causing open areas to be etched at and around the edges of the terminals. The terminals of this invention are not as thick and are almost completely flat thus avoiding those problems.

SUMMARY OF THE INVENTION

In accordance with this invention the glass sheet base for the electric heater plate is provided with a small area of silver in the location to be occupied by the circuit terminals. The silver being provided as a low resistance conductive silver paste and silk-screened onto the terminal area before tempering. During the subsequent heating cycle at an elevated temperature of 600 – 625''C., the silver is effectively bonded permanently to the glass. Subsequently, the entire surface of the glass is metallized with the coating of aluminum. The circuit is then silk-screened with a suitable etching bath resistant paint, the paint dried, and then the aluminum is etched away from the glass in the exposed areas in an etching bath in a known and conventional way. Over the terminal area a small portion of the aluminum is etched away to expose the silver surface. As a final step the plate is sprayed with a coating of heat resistant lacquer to protect the silver from atmospheric attack and to render the clear areas between the grid lines opaque. During manufacture lead wires can be soldered to the silver terminals in a conventional manner which operation by its heat removes the lacquer film over the silver exposed through the aluminum.

DETAILED DESCRIPTION OF THE INVENTION

Figure 1:
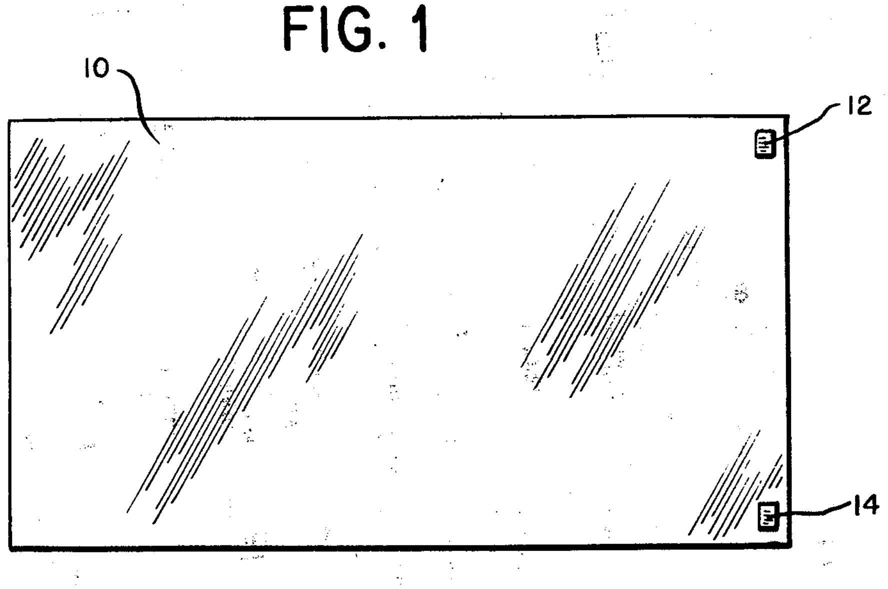
FIG. 1 is a plan view of a sheet of glass having the silver applied to the terminal areas.

As shown in FIG. 1 a sheet of glass 10 has had applied thereto terminal areas 12 and 14 of silver. These terminal areas 12 and 14 may be of any desired size with a dimension of approximately ½ inch by ½ inch being convenient for most such plates.

The silver is first applied through a silk-screen in a conventional manner, which silk-screen has the pattern of the terminals 12 and 14 provided therein, such that when a low resistance conductive silver paste is applied therethrough it passes through the screen and adheres to the glass 10, the pattern being dictated by the silk-screen such as the squares shown at 12 and 14. Typical of the low resistance conductive silver paste that may be used are Drakenfeld Silver Paste A953 or Englehard Hanovia Silver 9124, both commercially available. The former, for example, may be obtained from the Drakenfeld Division, Imperial Color and Chemical Dept. of Hercules Incorporated, Washington, Pennsylvania. This conductive Silver Paste No. A953 is finely divided particles of silver milled in squeegee oil and has other organic additives to facilitate silk-screening of the paste. The additives burn out during the subsequent firing.

The glass sheet with the silver paste applied is heated to a temperature range of about 600°–625°C for from 4–5 minutes in a tempering furnace. This is above the strain point of the glass but below its softening point and this heating treatment tempers the glass. Additionally, during this tempering treatment of the glass, the fine particles of silver melt and bond to the glass by a bond believed to be in part chemical and in part mechanical.

Subsequent to the firing of the silver to the glass sheet the entire surface of the glass including the silver terminal areas is metallized with a coating of aluminum. This metallizing process is well known and need not be described in complete detail here. However, briefly, an aluminum wire is atomized in a oxygen/propane flame and deposited upon the heated surface of the glass. The glass for this purpose is heated in a range from about 550° to about 730°F. The heated glass is usually coated with the atomized aluminum while on a conveyor belt and the thickness of the coating depends in large part on the speed of the conveyor belt with the conveyor being slowed for thicker coatings. The thickness of the aluminum is carefully controlled to obtain the desired resistance on the finished plate. From 2 to 3 mils is the presently preferred thickness of the aluminum coating. After metallizing the plate with an aluminum coating and cooling the same, the grid pattern of the circuit is silk-screened with a suitable etch resistant paint of which many are known with several enamel resists being particularly useful. The silk-screen pattern corresponds to that of the desired grid design such as the grid 16 shown in FIG. 2. As shown the pattern for grid 16 includes terminal areas 18 and 20 which overly the silver terminal areas 12 and 14 respectively. The terminal areas 18 and 20 of the grid 16 are larger than the corresponding silver terminal areas 12 and 14. A currently preferred size for the silver layer for the terminal area 12 and 14 is approximately ½ inch by ½ inch. The size of the overlying aluminum areas 18 and 20 is somewhat larger with ⅝ inch by ¾ inch being a satisfactory size when using silver layers of ½ inch by ½ inch. The terminal area size is at least ⅝ inch wide and is of an area sufficiently large to properly conduct the electrical load of the heater plate when operating, for example, below about 175°F.

In addition to protecting the silver, the large terminal area offers very little electrical resistance. This allows the terminal area to remain relatively cold during operation. The center of the heater plate may reach 400°F during operation which temperature would weaken the solder bond used to connect the lead wire to the terminal should the terminal ever reach this temperature. The large terminal area prevents such from occurring.

The grid lines, other than at the terminals run upwards from a minimum 1/16 inch width. There is no upper limit to the width of the grid lines other than the overall resistance required to produce a given wattage.

The etching bath resist is not applied to those areas outside of the boundries of the electrical grid circuit shown since in those areas the aluminum is to be removed by etching.

Also not covered with resist are smaller areas 22 and 24 within the terminal areas 18 and 20 respectively. Accordingly, in the subsequent etching operation the small areas 22 and 24 of aluminum will be etched away exposing the underlying silver. The open areas 22 and 24 are preferably, but not necessarily, circles ⅜ inch in diameter.

Figure 2:
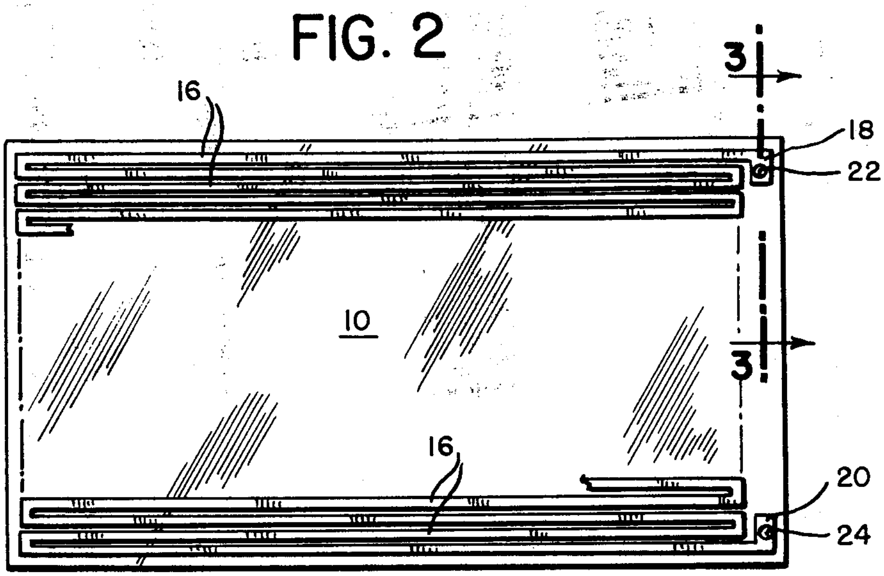
FIG. 2 is a similar view of the plate of FIG. 1 with the electrical circuit completed thereon.
Figure 3:
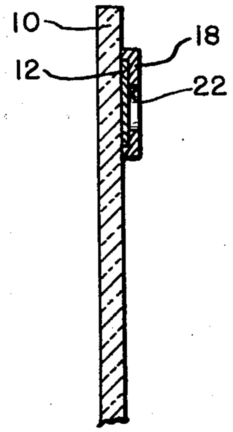
FIG. 3 is taken along the lines 3—3 of FIG. 2.

Subsequent to the application of the resist, the grid pattern is retained and the other aluminum on the plate etched away in a conventional etching bath followed by a suitable neutralizing bath. The heater plate will then have the appearance as shown in FIG. 2 with the silver areas 12 and 14 similarly bonded to the underlying glass 10 and to the overlying aluminum terminal areas 18 and 20, but with exposure of the silver through the aluminum terminal areas in the openings 22 and 24. In FIG. 2 the full grid pattern is not shown merely as a convenience. It will be understood that the pattern repeats throughout the surface in the same manner as the top and bottom portions of the pattern shown.

The plate is then sprayed with a coating of heat resistant lacquer which renders the clear areas of glass between the grid lines opaque and at the same time covers the exposed silver in the areas 22 and 24 of the terminals 18 and 20. This lacquer serves to protect the silver from any possible attack from sulphur in the atmosphere which can cause the formation of silver sulphate on the surface thereof. A number of suitable heat resistant lacquers are known and commercially available. One typical lacquer of this type is White Nubelon Lacquer - AGL-3815 obtainable from the Glidden-Durkee Division of SCM Corporation, Coatings and Resins Group, Atlanta, Georgia. The manufacturer describes this lacquer as being an alkyd-based silicone modified heat-resisting lacquer. It contains no lead and is designed for high temperature work. When the electric heater plate is to be incorporated into a heating system the lead wires are then soldered to the silver terminals 12 and 14, through the openings 22 and 24. Ordinary resin core 60 – 40 grade solder is suitable. During soldering the heating thereof removes the thin lacquer film from the silver permitting the solder to adhere thereto. The solder should fill in the openings 22 and 24 in order to continue to protect the silver from corrosion by the atmosphere.

It has ben found that terminals of this type can be more consistently produced to acceptable quality standards then the built-up type previously referred to. Additionally, silver being an excellent conductor, the terminals tend to operate cooler than the conventional terminals.

I claim:

1. An electric heater plate comprising a sheet of tempered glass, at least a pair of terminal areas on one face of said glass sheet and a terminal member formed of a layer of silver bonded to said glass sheet within each terminal area, an electrically conductive heating circuit of aluminum extending in a pattern over said one face and including a terminal disposed over each terminal area to cover completely said terminal member, said heating circuit bonded both to said one face of said glass sheet and to each terminal member and in electrical contact with the latter, and an opening in each terminal of said heating circuit at said terminal areas through to each terminal member for exposing a portion of each underlying terminal member whereby said electric heater plate is adapted for electrical connection in an external circuit.

2. The electric heater plate of claim 1 wherein said heating circuit is formed by a grid connecting said terminals.

3. The electric heater plate of claim 1 including a coating of heat resistant lacquer overlying at least the silver exposed through said opening whereby to protect said silver from atmospheric corrosion.

4. The electric heater plate of claim 3 in which said coating extends over substantially the entire surface of said plate including the heating circuit and the exposed glass sheet.

5. The electric heater plate of claim 4 in which the portion of said heater circuit overlying said silver layer has a minimum dimension parallel to the plane of said plate of ⅝ inch.

6. The electric heater plate of claim 5 in which the area of said silver layer is substantially equal to that of a square ½ inch by ½ inch in size.

7. The electric heater plate of claim 6 in which the portion of said aluminum circuit overlying said silver layer has an area substantially equal to that of a rectangle ⅝ inch by ¾ inch in size.

8. The electric heater plate of claim 7 in which said opening is a circle substantially ⅜ inch in diameter.

9. In an electric heater plate in which an electrically conductive aluminum circuit is bonded to one face of a sheet of tempered glass and in which said circuit includes at least a pair of terminal areas for receipt of a lead wire, the improvement in which each terminal area comprises a layer of silver bonded to said one surface of said glass sheet, said aluminum circuit overlies completely, is bonded to and in electric connection with said silver layer, and an opening in said aluminum circuit at said terminal areas exposing said silver layer for receipt of a lead wire whereby said electrically conductive aluminum circuit is adapted for connection in an external circuit.

* * * * *